(12) United States Patent
Kirchhoff et al.

(10) Patent No.: US 8,503,646 B1
(45) Date of Patent: Aug. 6, 2013

(54) METHODS AND SYSTEMS FOR ROUTING CALLS

(75) Inventors: Leland W. Kirchhoff, Santa Barbara, CA (US); David S. Trandal, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 0 days.

(21) Appl. No.: 13/529,273

(22) Filed: Jun. 21, 2012

Related U.S. Application Data

(63) Continuation of application No. 11/697,163, filed on Apr. 5, 2007, now Pat. No. 8,270,582.

(60) Provisional application No. 60/789,394, filed on Apr. 5, 2006.

(51) Int. Cl.
*H04M 3/42* (2006.01)
*H04M 1/56* (2006.01)
*H04M 15/06* (2006.01)

(52) U.S. Cl.
USPC ............ 379/201.01; 379/142.07; 379/207.08; 379/207.16

(58) Field of Classification Search
USPC ............... 379/114.17, 114.2, 121.03, 121.04, 379/126, 142.07, 201.01, 201.02, 201.12, 379/207.08, 207.9, 207.1, 207.16
See application file for complete search history.

(56) References Cited

U.S. PATENT DOCUMENTS

| | | | |
|---|---|---|---|
| 3,936,613 | A | 2/1976 | Nishigori et al. |
| 3,956,595 | A | 5/1976 | Sobanski |
| 4,009,337 | A | 2/1977 | Sakai et al. |
| 4,022,983 | A | 5/1977 | Braun et al. |
| 4,277,649 | A | 7/1981 | Sheinbeing |
| 4,485,470 | A | 11/1984 | Reali |
| 4,736,405 | A | 4/1988 | Akiyama |

(Continued)

FOREIGN PATENT DOCUMENTS

| | | |
|---|---|---|
| CA | 1329852 | 9/1989 |
| EP | 1 120 954 | 8/2001 |

(Continued)

OTHER PUBLICATIONS

Article: "Widget MySpace Widget"; posted by 4INFO Bob; http://4info.typepad.com/blog/2006/09/widget_myspace_html; Sep. 15, 2006; 3 pages.

(Continued)

*Primary Examiner* — Khai N Nguyen
(74) *Attorney, Agent, or Firm* — Knobbe, Martens, Olson & Bear LLP

(57) ABSTRACT

Methods and systems for processing and routing calls are described. A call processing system receives from a telecommunications system a communication indicating that a first call to a user is in progress. A call routing instruction associated with the user is accessed. Based at least in part on the call routing instruction, a second call to be placed to a first telephonic device and a third call to be placed to a second telephonic device, wherein the second call and the third call are placed at substantially the same time or a second call to be placed to a first telephonic device and a third call to be placed to a second telephonic device, wherein the third call is placed if the second call is not timely answered.

20 Claims, 9 Drawing Sheets

U.S. PATENT DOCUMENTS

| | | | |
|---|---|---|---|
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,361,295 A | 11/1994 | Solomon et al. | |
| 5,384,831 A | 1/1995 | Creswell et al. | |
| 5,404,537 A | 4/1995 | Olnowich et al. | |
| 5,434,908 A | 7/1995 | Klein | |
| 5,440,620 A | 8/1995 | Slusky | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,533,106 A | 7/1996 | Blumhardt | |
| 5,548,636 A | 8/1996 | Bannister et al. | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,862,208 A | 1/1999 | MeLampy et al. | |
| 5,894,504 A | 4/1999 | Alfred et al. | |
| 5,894,595 A | 4/1999 | Foladare et al. | |
| 5,912,948 A | 6/1999 | Nelson et al. | |
| 5,940,484 A | 8/1999 | DeFazio et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,991,367 A | 11/1999 | Robuck | |
| 5,995,594 A | 11/1999 | Shaffer et al. | |
| 5,995,603 A | 11/1999 | Anderson | |
| 5,999,806 A | 12/1999 | Kaplan et al. | |
| 6,014,436 A | 1/2000 | Florence et al. | |
| 6,023,503 A | 2/2000 | Schneider et al. | |
| 6,031,896 A | 2/2000 | Gardell et al. | |
| 6,032,051 A | 2/2000 | Hall et al. | |
| 6,034,956 A | 3/2000 | Olnowich et al. | |
| 6,035,031 A | 3/2000 | Silverman | |
| 6,041,103 A | 3/2000 | La Porta et al. | |
| 6,044,059 A | 3/2000 | Olnowich | |
| 6,055,430 A | 4/2000 | Cooper et al. | |
| 6,078,581 A | 6/2000 | Shtivelman et al. | |
| 6,100,873 A | 8/2000 | Bayless et al. | |
| 6,101,249 A | 8/2000 | Weber | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,173,054 B1 | 1/2001 | Beyda et al. | |
| 6,175,622 B1 | 1/2001 | Chiniwala et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,230,009 B1 | 5/2001 | Holmes et al. | |
| 6,233,318 B1 | 5/2001 | Picard et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,292,478 B1 | 9/2001 | Farris | |
| 6,304,565 B1 | 10/2001 | Ramamurthy | |
| 6,310,939 B1 | 10/2001 | Varney | |
| 6,337,898 B1 | 1/2002 | Gordon | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,374,102 B1 | 4/2002 | Brachman et al. | |
| 6,381,459 B1 | 4/2002 | Gervens et al. | |
| 6,405,035 B1 | 6/2002 | Singh | |
| 6,411,601 B1 | 6/2002 | Shaffer et al. | |
| 6,411,692 B1 | 6/2002 | Scherer | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,529,587 B1 | 3/2003 | Cannon et al. | |
| 6,535,585 B1 | 3/2003 | Hanson et al. | |
| 6,539,084 B1 | 3/2003 | Long | |
| 6,542,596 B1 | 4/2003 | Hill et al. | |
| 6,545,589 B1 | 4/2003 | Fuller et al. | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,621,892 B1 | 9/2003 | Banister et al. | |
| 6,643,034 B1 | 11/2003 | Gordon et al. | |
| 6,658,100 B1 * | 12/2003 | Lund | 379/201.01 |
| 6,661,785 B1 | 12/2003 | Zhang et al. | |
| 6,661,886 B1 | 12/2003 | Huart et al. | |
| 6,662,232 B1 | 12/2003 | Nicholls et al. | |
| 6,690,785 B1 | 2/2004 | Stelter et al. | |
| 6,697,478 B1 | 2/2004 | Meldrum et al. | |
| 6,721,408 B1 | 4/2004 | Bain et al. | |
| 6,748,058 B1 | 6/2004 | Schwend et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,792,094 B1 | 9/2004 | Kirkpatrick | |
| 6,829,332 B2 | 12/2004 | Farris et al. | |
| 6,857,074 B2 | 2/2005 | Bobo, II | |
| 6,898,275 B2 | 5/2005 | Dolan et al. | |
| 6,950,502 B1 | 9/2005 | Jenkins | |
| 6,965,917 B1 | 11/2005 | Aloni et al. | |
| 6,968,174 B1 | 11/2005 | Trandal et al. | |
| 6,999,572 B1 | 2/2006 | Shaffer et al. | |
| 7,003,087 B2 | 2/2006 | Spencer et al. | |
| 7,006,455 B1 | 2/2006 | Fandrianto et al. | |
| 7,027,567 B1 | 4/2006 | Scott et al. | |
| 7,120,455 B1 | 10/2006 | Chen et al. | |
| 7,209,964 B2 | 4/2007 | Dugan et al. | |
| 7,231,029 B1 | 6/2007 | Kirkpatrick | |
| 7,254,219 B1 | 8/2007 | Hansen et al. | |
| 7,263,178 B1 | 8/2007 | Brothers et al. | |
| 7,382,773 B2 | 6/2008 | Schoeneberger et al. | |
| 7,388,949 B2 | 6/2008 | Contractor et al. | |
| 7,397,910 B2 | 7/2008 | Dolan et al. | |
| 7,409,048 B2 | 8/2008 | Trandal et al. | |
| 7,412,050 B2 | 8/2008 | Renner et al. | |
| 7,433,454 B2 | 10/2008 | Watanabe | |
| 7,522,580 B2 | 4/2009 | Miller et al. | |
| 7,548,756 B2 | 6/2009 | Velthius et al. | |
| 7,688,958 B2 | 3/2010 | Dolan et al. | |
| 7,822,188 B1 | 10/2010 | Kirchhoff et al. | |
| 7,839,987 B1 | 11/2010 | Kirchhoff et al. | |
| 8,000,455 B1 | 8/2011 | Van Haaften et al. | |
| 8,081,740 B2 | 12/2011 | Reynolds et al. | |
| 2002/0010616 A1 | 1/2002 | Itzhaki | |
| 2002/0035616 A1 | 3/2002 | Diamond et al. | |
| 2002/0085687 A1 | 7/2002 | Contractor et al. | |
| 2002/0097710 A1 | 7/2002 | Burg | |

| | | |
|---|---|---|
| 2003/0021403 A1 | 1/2003 | Jones |
| 2003/0039339 A1 | 2/2003 | Luehrig et al. |
| 2003/0055974 A1 | 3/2003 | Brophy et al. |
| 2003/0063731 A1 | 4/2003 | Woodring |
| 2003/0108172 A1 | 6/2003 | Petty et al. |
| 2003/0108178 A1 | 6/2003 | Nguyen et al. |
| 2003/0123629 A1 | 7/2003 | Hussain et al. |
| 2003/0156700 A1 | 8/2003 | Brown et al. |
| 2003/0185375 A1 | 10/2003 | Albal |
| 2003/0191823 A1 | 10/2003 | Bansal et al. |
| 2003/0215078 A1 | 11/2003 | Brahm et al. |
| 2004/0028203 A1 | 2/2004 | Wurster et al. |
| 2004/0066926 A1 | 4/2004 | Brockbank et al. |
| 2004/0073566 A1 | 4/2004 | Trivedi |
| 2004/0105536 A1 | 6/2004 | Williams |
| 2004/0120478 A1 | 6/2004 | Reynolds et al. |
| 2004/0141594 A1 | 7/2004 | Brunson et al. |
| 2004/0141598 A1 | 7/2004 | Moss et al. |
| 2004/0174983 A1 | 9/2004 | Olschwang et al. |
| 2004/0190706 A1 | 9/2004 | Fleischer, III et al. |
| 2004/0196867 A1 | 10/2004 | Ejzak et al. |
| 2004/0218743 A1 | 11/2004 | Hussain et al. |
| 2004/0240641 A1 | 12/2004 | Cohen et al. |
| 2004/0247105 A1 | 12/2004 | Mullis et al. |
| 2004/0249650 A1 | 12/2004 | Freedman et al. |
| 2004/0258220 A1 | 12/2004 | Levine et al. |
| 2005/0010573 A1 | 1/2005 | Garg |
| 2005/0025295 A1 | 2/2005 | Christie, IV |
| 2005/0053216 A1 | 3/2005 | Spencer et al. |
| 2005/0063529 A1 | 3/2005 | Meldrum et al. |
| 2005/0078612 A1 | 4/2005 | Lang |
| 2005/0117726 A1 | 6/2005 | DeMent et al. |
| 2005/0123118 A1 | 6/2005 | Terry et al. |
| 2005/0152525 A1 | 7/2005 | Kent et al. |
| 2005/0154599 A1 | 7/2005 | Kopra et al. |
| 2005/0176417 A1* | 8/2005 | Files et al. ................ 455/422.1 |
| 2005/0186950 A1 | 8/2005 | Jiang |
| 2005/0201534 A1 | 9/2005 | Ignatin |
| 2005/0207432 A1 | 9/2005 | Velez-Rivera et al. |
| 2005/0207556 A1 | 9/2005 | Gonzalez et al. |
| 2005/0265322 A1* | 12/2005 | Hester ........................ 370/352 |
| 2005/0283372 A1* | 12/2005 | Jorgenson et al. ............... 705/1 |
| 2005/0286498 A1 | 12/2005 | Rand et al. |
| 2005/0287993 A1 | 12/2005 | Gogic |
| 2006/0002536 A1* | 1/2006 | Ambrose ................. 379/201.01 |
| 2006/0013374 A1 | 1/2006 | Fleischer, III et al. |
| 2006/0077957 A1 | 4/2006 | Reddy et al. |
| 2006/0116105 A1* | 6/2006 | Frankel et al. ................ 455/406 |
| 2006/0227957 A1 | 10/2006 | Dolan et al. |
| 2006/0239429 A1 | 10/2006 | Koch et al. |
| 2006/0268007 A1 | 11/2006 | Gopalakrishnan |
| 2006/0276193 A1 | 12/2006 | Itzkovitz et al. |
| 2007/0002077 A1 | 1/2007 | Gopalakrishnan |
| 2007/0003047 A1 | 1/2007 | Batni et al. |
| 2007/0067738 A1 | 3/2007 | Flynt et al. |
| 2007/0093255 A1 | 4/2007 | Nurminen et al. |
| 2007/0153999 A1 | 7/2007 | Daigle |
| 2007/0160188 A1 | 7/2007 | Sharpe et al. |
| 2007/0171898 A1 | 7/2007 | Salva |
| 2007/0189267 A1 | 8/2007 | Metcalf et al. |
| 2007/0202898 A1 | 8/2007 | Bae et al. |
| 2008/0071745 A1 | 3/2008 | Clarke |
| 2008/0152101 A1 | 6/2008 | Griggs |
| 2008/0219424 A1 | 9/2008 | Moss et al. |
| 2009/0052647 A1 | 2/2009 | Wood et al. |
| 2009/0100027 A1 | 4/2009 | Malik |
| 2010/0008356 A1 | 1/2010 | Boni et al. |
| 2010/0142685 A1 | 6/2010 | Dolan et al. |
| 2010/0202601 A1 | 8/2010 | Frank |

FOREIGN PATENT DOCUMENTS

| | | |
|---|---|---|
| JP | 10-107901 | 4/1998 |
| JP | 10-322462 | 12/1998 |
| JP | 10-322465 | 12/1998 |
| JP | 10-513632 | 12/1998 |
| JP | 11-506292 | 6/1999 |
| JP | 2001-168989 | 6/2001 |
| WO | WO 97/26749 | 7/1997 |
| WO | WO 98-36551 | 8/1998 |
| WO | WO 99-14924 | 3/1999 |
| WO | WO 00 60840 | 10/2000 |
| WO | WO 01/76210 | 10/2001 |

OTHER PUBLICATIONS

Article: Communications-SMS, Dashboard Widgets—Showcase; http://www.dashboardwidgets.com/showcase/details. php?wid=1082; Oct. 14, 2005; 2 pages.

Communication pursuant to Article 94(3) EPC; EP Application 03731252.7, dated Jun. 3, 2009; 6 pages.

International Search Report dated May 19, 2003, PCT/US03/15807.

Johnson, D., Article "Now You're Talking—voice—response systems for home offices—Product Information"; http://www.findarticles.com; Feb. 1999.

Supplemental European Search Report, EP Application 03731252.7, dated Jun. 6, 2006.

* cited by examiner

METHODS AND SYSTEMS FOR ROUTING CALLS

CROSS-REFERENCE TO RELATED APPLICATIONS

This application is a continuation of U.S. application Ser. No. 11/697,163, filed Apr. 5, 2007, which claims priority from U.S. Patent Application No. 60/789,394, filed Apr. 5, 2006, which are hereby incorporated by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to methods and systems for telecommunications, and in particular, to methods and systems for routing calls between networks.

2. Description of the Related Art

Telephonic communication is becoming more complex. It is common for users to not only have a shared, "fixed" landline phone, but also a mobile phone, and even a VoIP (e.g., personal computer-based) phone. Different phone types can have corresponding different sets of value for the user. For example, in certain instances, the landline phone might be the most reliable, highest quality, can be shared across family members, and may have unlimited inbound and local outbound calling within a designated area. The mobile phone, while in certain instances, may be more expensive to use on a per minute basis, also gives the user mobility features and additional personalization options. A VoIP phone may have the lowest costs for placing "long distance" calls.

SUMMARY OF THE INVENTION

Described herein as example methods and systems for processing and routing calls between networks, such as, by way of example, between networks for landline phones and mobile networks.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention. In the drawings, like reference numerals refer to like components.

DETAILED DESCRIPTION OF PREFERRED EMBODIMENTS

Figure 1:
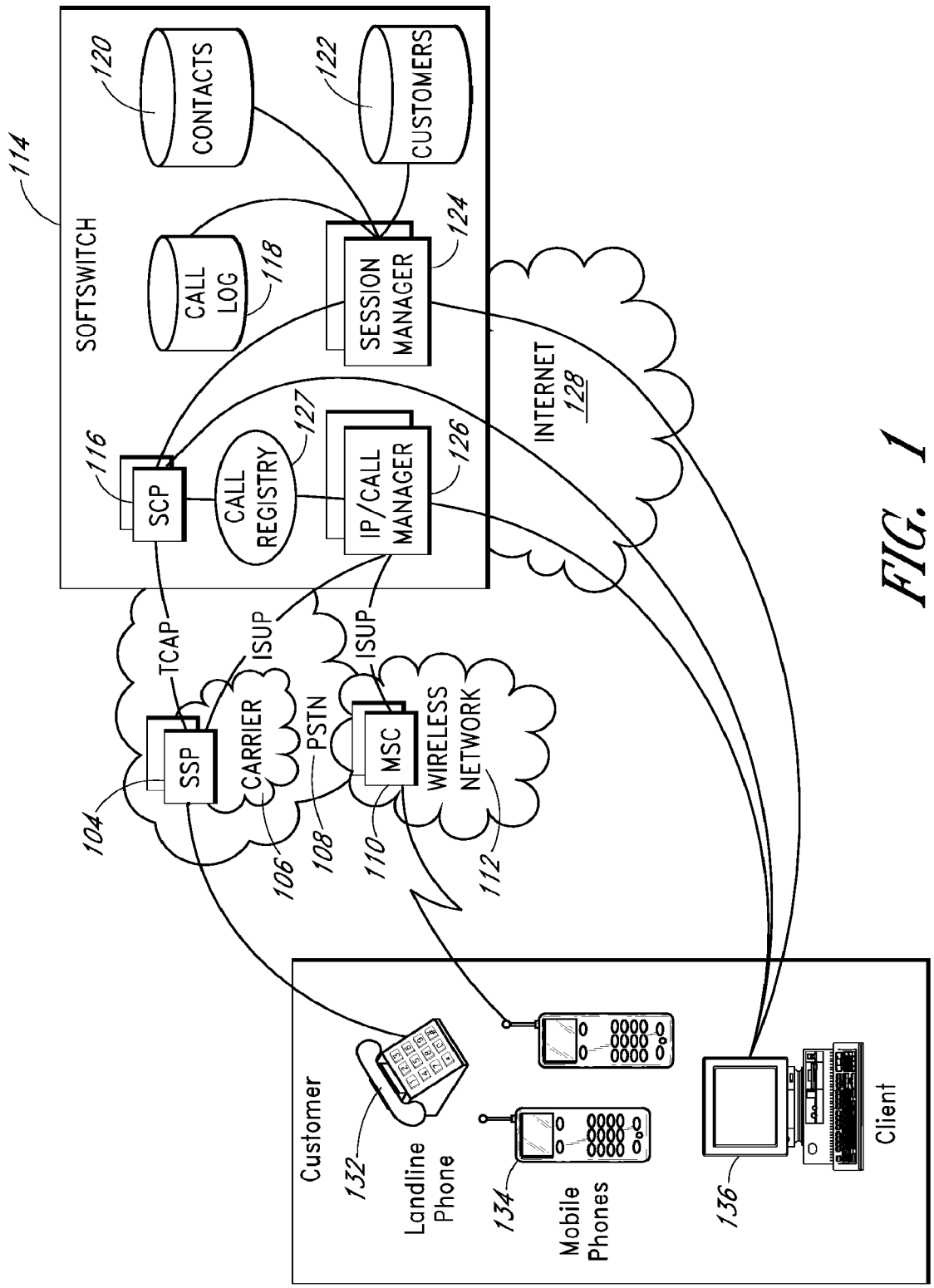
FIG. 1 illustrates an example operating environment of a call routing service.

Example embodiments of methods and systems are described herein that route calls to customer's landline phone, mobile phones, VoIP phones, and/or personal computers. Certain embodiment use condition monitors/triggers, such as the SS7 Advanced Intelligent Network (AIN) triggers, in providing such call routing services.

Integrating a user's VoIP, mobile cell, and/or landline phones and networks can make it easier for a user to stay in touch with others, control phone costs, and take advantage of Internet-based communication advancements and visual interfaces.

The following patent applications are incorporated by reference in their entirety, and the systems and methods disclosed herein can be used in conjunction with disclosed systems and methods in the following patent applications:

U.S. patent application Ser. No. 11/374,390, filed Mar. 13, 2006, entitled "Systems and Methods for Call Screening";

U.S. Patent Application No. 60/696,135, filed Jul. 1, 2005, entitled "Methods and Systems for Call Routing via a Telephone Number";

U.S. Patent Application No. 60/752,521, filed Dec. 20, 2005, entitled "Methods and Systems for Call Routing via a Telephone Number";

U.S. patent application Ser. No. 11/366,989, filed Mar. 2, 2006, entitled "Methods and Systems for Creating a Dynamic Call Log and Contact Records";

U.S. Provisional patent application 60/781,894, filed Mar. 13, 2006, entitled "Methods and Systems for Personalizing Calling/Caller Name";

U.S. patent application Ser. No. 11/480,277, filed Jun. 30, 2006;

U.S. patent application Ser. No. 11/496,968, filed Aug. 1, 2006;

U.S. patent application Ser. No. 11/686,841, filed Mar. 15, 2007.

In an example embodiment, a call management system or softswitch interfaces to a switch (e.g., a Carrier Partner (CP) switch) to instruct the switch how to route calls to various devices (e.g., mobile, landline, and/or VoIP phones). Such functionality may be particularly valuable in small households and in SOHO (Small Office/Home Office) applications, although the processes and apparatus disclosed herein can be used in other telephony applications (e.g., large offices). In an example embodiment, a landline phone number becomes a virtual number by which the customer can be reached at a variety of different location (e.g., at home, work, or on the move (e.g., on travel or in the processes of moving residences). In accordance with a customer's routing instructions, calls route to a destination that corresponds to where the customer is (or is likely to be), and when calls reach the customer, optionally the calls can be screened (via the caller ID of the caller and/or by streaming in substantially real time a message being recorded by the caller on a voice answering system to a telephonic terminal at the customer's current location), thus enabling the customer to selectively handle (e.g., accept, forward, reject, transfer, etc.) their calls. A call log of inbound and/or outbound calls can be accessed via a client application, a Web browser, or otherwise.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the following description refers to example network and telephony standards and protocols (e.g., SS7, SIP, etc.), other standards and protocols can be used as well. In addition, while references may be made to electronic address books or contact lists, other data stores and formats can be used to store contact information. While certain intelligent network triggers are referred to herein, other triggers, condition detectors/monitors, or events can be used as well.

The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well to receive calls, place calls, and/or transfer calls. While certain phone addresses are referenced for purposes of illustration, other electronic addresses or locators can be used as well. While a SIP federated phone may be referred to, other data phone, such as an XMPP federation phone, a Skype phone (or other phone that communicates via a peer-to-peer telephony network), or other networked phone, which may be in the form of a softphone, may be used.

In addition, while reference may be made to electronic address books or contact lists, other data stores and formats can be used to store contact information. While certain intelligent network triggers are referred to herein, other triggers, event monitors, or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone (e.g., with an operating system and where the user can install applications), and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain user interfaces, call data, contact information, are described as being provided by a client application hosted on a computer terminal, the same or similar interface, call data, and contact information can be provided via one or more Web pages (e.g., hosted by a call processor system, a carrier system, and/or other system) accessible via a browser or other Web page access software.

While certain phone numbers are referenced for purposes of illustration, other phone numbers or electronic addresses or locators can be used as well. The term MVNO refers to an entity that resells wireless services of a carrier under its own brand name, using the network of another mobile phone operator.

In an example embodiment, enhanced call management services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carrier, such as Carrier Partners (e.g., carriers who are partners with a third party call processing operator in providing enhanced call processing services) to provide calling services. In another example, SS7 Wireless Intelligent Network (WIN) triggers are set in the mobile switches (e.g., of Wireless Carrier Partners) to provide calling services.

Example functionality, operations, and implementations for example call processing services will now be described in detail.

GLOSSARY

AIN—Advanced Intelligent Network
CP—Carrier Partner
IP—Intelligent Peripheral
ISUP—ISDN User Part
MDN—Mobile Device Number
MVNO—Mobile Virtual Network Operator
MWI—Message Waiting Indicator
MSC—Mobile Switching Center
PSTN—Public Switched Telephone Network
SCP—Service Control Point
SIP—Session Initiation Protocol
SOHO—Small Office/Home Office
SMPP—Short Message Peer to Peer
SS7—Signaling System 7
SSP—Service Switching Point
STP—Signal Transfer Point
TCAP—Transaction Capabilities Application Protocol
VoIP—Voice over Internet Protocol
Extensible Messaging and Presence Protocol—XMPP In the example embodiment, it is assumed that the customer has the following devices for illustrative purposes, although the user can have fewer, more, and/or different device types:

Landline phone serviced by a carrier (e.g., an CP);

One or more mobile phones, some of which may be serviced by the carrier through a Mobile Virtual Network Operator (MVNO) relationship, and/or one or more mobile phones serviced by other wireless carriers but optionally forwarded to the CP's softswitch service environment;

One or more computer terminals (e.g., personal computers, interactive televisions, personal digital assistants, smart phone, etc.) running a telecommunication client which provides a VoIP phone (optionally with an associated graphical user interface) and a display of logged calls and contacts (e.g., manually or auto-created contact records).

A telecommunications client application (e.g., a personal computer client, a client hosted on an interactive television, a network personal digital assistant, a smart phone, etc.) is used to provide communication services (which can, but do not necessarily include voice communication via the client). Optionally, a customer can have multiple clients hosted on multiple terminals. In an example embodiment, the telecommunications client application connects to and communicates with the softswitch via the Internet, an intranet, or other network. The client application, executing on a subscriber's computer terminal, can make the subscriber's online presence known to the softswitch (e.g., by transmitting a message over the Internet to the softswitch). The client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded messages from callers, and can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log. Optionally, the customer can add new contacts to the contact database using an edit function on the telecommunications client and/or via a web browser user interface.

A converged routing service optionally allows the customer to define call routing priority, with respect to destinations associated with the customer. For example, the customer can specify the priority of their phones in terms of which phone is to be called first when a call to their landline phone number is received, which phone is to be called second, which phone is to be called third, whether certain phones are to be called at the substantially the same time (e.g., those associated with the same priority level), etc. The customer can configure the routing service via a telecommunications client, via a Web site associated with the softswitch, and/or otherwise, by way of example. A user or users, associated with the phones to which the call is initially routed, can optionally choose to take the call substantially immediately upon the phone ringing (e.g., by taking the phone off hook or activating a "take call" control), first screen the call and then take the call (assuming call screening is enabled), continue eavesdropping (listen to a message being left by a caller on an answering machine/system), or hang-up. Optionally, phones that receive the call secondarily start out it in screening mode (if screening is enabled). The call, when being presented in screening mode, optionally has a distinctive ring tone (e.g., the customer's phone can be set up to assign a designated ring tone to calls received with a designated caller ID associated with calls being presented in a screening mode).

The call is also optionally announced to the customer's online terminals having the telecommunications client executing and with online access, or to selected telecommunications clients. The user of the online terminal can screen the call, take the call on the terminal (e.g., via VoIP), or specify/select from a menu or other user interface as to where the call should be routed.

In an example embodiment, call handling processes are performed using triggers, such as armed AIN triggers set on the customer's phone address in carrier (e.g., a CP) switches servicing the customer's landline phones. For example, a phone company configures triggers at the appropriate points in the inbound calls for a subscriber/customer at an exchange, such as a local exchange. A service provider (e.g., that provides enhanced call processing services), associated with a softswitch and a system acting as a Service Control Point (SCP) in the SS7 network, receives queries from a local exchange (e.g., via a Service Switching Point (SSP)) that enables it to collect information about the call and/or instruct the switch how to handle the call. Optionally, the owner/operator of the softswitch enters into a contractual or other arrangement with the carrier associated with the SSP to set triggers on some or all of lines associated with the SSP. In another example, a phone company purchases or develops a softswitch (or Call Processing System) acting as an SCP in the SS7 network. The present operating environments are described by way of example, and other operating environments may be used as well By way of background, a trigger has an associated firing criterion. When a trigger is made active (armed), and its associated firing criteria is (are) satisfied, the trigger fires. When a trigger fires, in an example embodiment, a message is formatted with call related data and the message is transmitted by the SSP to the SCP. The SCP then reads and/or stores in computer readable memory some or all of this call related data and generates a response which the SSP then uses in further call processing.

The carrier's (e.g., CP's) MVNO assistance may also be used in configuring mobile phones to more effectively handle screening (e.g., configuring call forwarding on busy or ring-no-answer to softswitch).

FIG. 1 illustrates an example embodiment of system and network components involved in providing network-based services.

A carrier 106 (e.g., a Carrier Partner) customer has one or more landline phones 132 that connect to an SSP 104 (Service Switching Point) in the carrier's network. The customer may also have one or more mobile phones 134 and one or more hosts (e.g., personal computers) running a telecommunications client 136. The telecommunications client 136 has one or more user interfaces that display some or all of the following: a call log, a contact record/list, and active, in-progress calls. The customer can elect to screen or take an active call. Optionally, calls can also be made via the telecommunications client 136 (e.g., where the host is equipped with a speaker and microphone). Some or all of the foregoing client capabilities can optionally be provided via one or more web pages, widgets, gadgets, or other user interfaces. Further, optionally a subscriber can configures certain aspects of their account, such as call routing priorities and instructions, via the telecommunications client 136, an account configuration/set-up web page (e.g., hosted by the softswitch 114), a widget, a gadget, or otherwise.

In this example, the softswitch 114 has a number of components, some of which are optionally centralized at a given location, others of which may be co-located in the carrier's network (e.g., to reduce network transport costs). The SCP 116 (Service Control Point) is an AIN component that interacts with the SSPs 104 (e.g., using the TCAP (Transaction Capabilities Application Part) protocol). AIN triggers are armed for the customer's landline phone number/address/account so that when calls are made to or from that phone, a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle).

In another embodiment, SS7 Wireless Intelligent Network (WIN) triggers are set in the mobile switches of Wireless carriers (e.g., Carrier Partners) to optionally provide similar calling services but for a customer's mobile phone number/address/account.

The softswitch 114 also contains one or more systems referred to as call managers 126. The call managers 126 are connected to the PSTN 108 (e.g., via ISDN using the ISUP (ISDN User Part) protocol, by way of example). The call managers 126 service or provide some or all of the following: provide a call screening service when screening is to be provided, receive a caller message and store and/or route the voice message to a destination, provide a voice prompt or message that is to be played to a caller and/or called party, receive a fax and store and/or route the fax to a destination, detect speech or DTMF tones, convert speech that needs to be converted to text, and/or provide a gateway between the SS7 network and SIP networks. The example call manager 126 optionally can also act as an IP (Intelligent Peripheral), another AIN component that the SCP 116 can instruct the SSP 104 to connect into the call for interaction with the called and calling party. The IP/call managers 126 and SCPs 116 in the softswitch 114 optionally share a call registry 127 that stores information about active calls.

The session managers 124 in the softswitch 114 track telecommunication client presence and interact with a given telecommunications client 136 (e.g., a PC client) as call log, contact, and/or customer data needs to be synchronized with the centralized databases to provide the customer, via the client, with updated log, contact, and/or customer data. The session managers 124 also optionally provide the SCP 116 with service configuration information for the customer involved in a call. During an active call, the SCP 116 and/or IP/call manager 126 optionally directly interact with the telecommunications client to provide call progress information, and to stream audio.

The softswitch 114 in this example contains centralized databases and/or general-purpose storage area, optionally including, but not limited to, some or all of the following: a call log database 118, a contacts database 120, and a customer database 122. The call log database 118 stores call events and related data for incoming and outgoing calls. The contacts database stores information and parameters (e.g., names, identifiers, and/or phone numbers/addresses, etc.) associated with a called or calling party. The customer database stores information and parameters (e.g., account data and configuration information) associated with subscribers/customers.

The softswitch call processing system optionally includes other subsystems, such as some or all of the following: a router subsystem, which serves as an interface to the Internet to manage communications between online IP client devices and call processing servers, a web server subsystem to manage a "web site" associated with the softswitch (e.g., via which a user can access an account set-up/configuration user interface, a call log, a contacts database, etc., using a browser or other network user interface). These subsystems are optionally interconnected via a Local Area Network (LAN), a Wide Area Private Network (WAN), and/or a Wide Area Public Network (e.g., Internet).

The call manager 126 can communicate with the mobile phones 134 across the PSTN 108 over a wireless network 112 via the corresponding MSC 110. The softswitch 114 (e.g., via the call manager 126 and session manager 124) can communicate over the Internet 128 with telecommunications client 136, browsers, widgets, etc.

Several example scenarios are discussed below to illustrate the operation of certain integrated services. While the following example scenarios are considered, other scenarios (e.g., different routings, communication devices, client hosts, etc.) can take place:

A location (e.g., a household or small business) is equipped with a personal computer, a landline phone, and a mobile phone. The landline phone and mobile phone are configured (by the CP or user, by way of example) in this example, to be of equal priority for receiving calls, which means that they are rung substantially simultaneously when the landline phone number is called. In this example, phone screening (e.g., wherein the softswitch streams a message being left by a caller to the client so that the called party can listen to the message via their computer or phone in substantially real time and the caller is not enabled to hear the called party (e.g., no return talk path is provided from the called party to the caller unless the called party accepts the call)) is disabled.

A location (e.g., a household or small business) is equipped with a personal computer, a landline phone, and a mobile phone. The landline phone and mobile phone are configured (by the CP or user, by way of example) to be of equal priority for receiving calls, which means that they are rung substantially simultaneously when the landline phone number is called (e.g., outcalls are placed to both the landline and mobile phones at substantially the same time). In this example, phone screening is enabled.

A location (e.g., a household or small business) is equipped with a personal computer, a landline phone, and two mobile phones, one of which is serviced by the CP MVNO, and the other serviced by another wireless carrier. In this example scenario, the landline phone has highest routing priority and the two mobile phones are second in priority. Screening is enabled.

The foregoing scenarios involve the routing of an inbound call.

Figure 2:
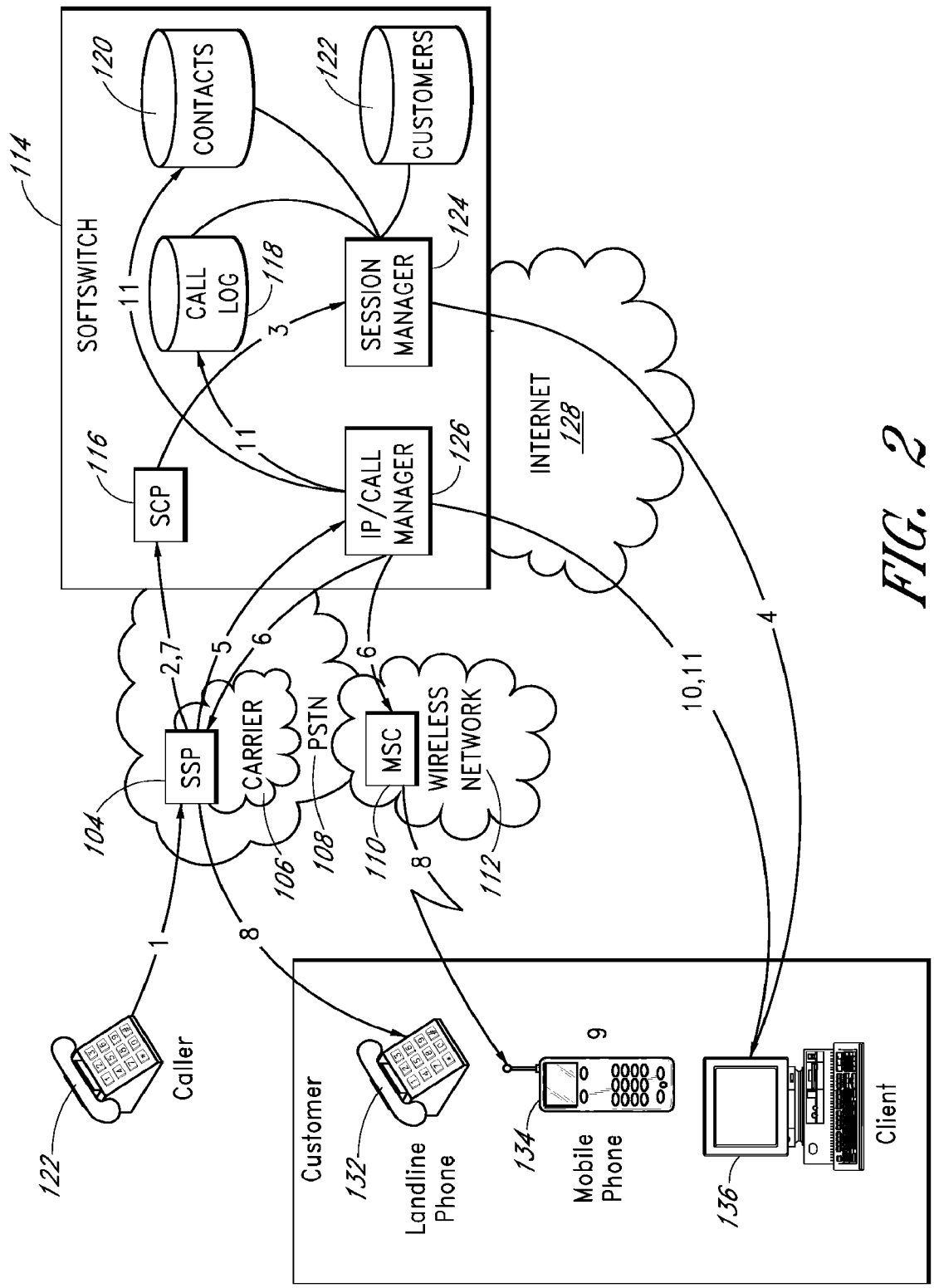
FIG. 2 illustrates a first example operating environment and example call routing service using condition monitors.

Inbound call routing to devices having the same priority level will now be described. FIG. 2 illustrates an example system and network components involved in providing an integrated call routing service using triggers (e.g., AIN triggers). In this scenario, a caller dials a user/customer's landline phone number and, per the customer's configuration stored in, and read from a database, the call is routed substantially simultaneously to the customer's landline phone and mobile phone. The customer has call screening disabled. Triggers (e.g., AIN triggers set on the phone address of a subscriber) are used by the softswitch 114 to at least partially control the call and route the call appropriately. An example call handling sequence is as follows:

State 1. A caller dials the customer's landline phone number/address. The call is routed through the PSTN 108 to the carrier switch 104 (e.g., a Service Switching Point (SSP)) serving that customer's landline phone 132.

State 2. A trigger (e.g., a Termination_Attempt trigger), armed in the SSP 104 for this phone line fires, causing a message (e.g., a Transaction Capabilities Application Part (TCAP) query) to be transmitted to the configured SCP point code, which, in this example is assigned to the softswitch 114. The TCAP query includes call signaling information, including, for example, the caller phone number/address, a privacy indicator, a designation of whether the call was a forwarded call, and/or the called party phone number/address and/or another identifier associated with the called party (e.g., an account number).

State 3. The softswitch 114 verifies the called phone number is that of a customer (e.g., a subscriber of a service offered by the operator of the softswitch and/or other entity having an account associated with the softswitch), optionally by determining if the called phone number and/or other called party identifier matches a customer number and/or other corresponding identifier in the customer database 122 (which stores customer account records). The softswitch SCP 116 queries the softswitch session manager 124 to obtain the inbound call routing configuration (e.g., route to landline and mobile phone) for this customer and the client (e.g., the telecommunications client 136) presence (e.g., online or offline).

In this example, the customer's client 136 is currently online. The customer in this example has configured their service to route calls to their landline phone 132 and mobile phone 134 at the same time, with phone screening disabled. Optionally, the customer can configure the call routing via an account set-up user interface, which will then be stored in the customer database 122. In this example, AIN does not provide sufficient control of the SSP 104 to support simultaneous routing, and so the SCP 116 responds with a message (e.g., Forward_Call) to route the call to the call manager 126. The SCP 116 also records the state of this call in a call registry 127 in the softswitch 114 for sharing with the call manager 126 and other subsystems.

State 4. The session manager 124 notifies the telecommunications client 136 (e.g., hosted on a personal computer) on the SCP's behalf that there is an incoming call. The telecommunications client 136 displays the call in an "active call" window (e.g., a call alert user interface) with the status set to "ringing". A "Take Call" button on the telecommunications client 136 is available to the customer, via which the customer can provide a call handling instruction (e.g., establish duplex communication with the caller).

State 5. A trigger fires in the SSP 104 (e.g., TnoAnswerTimer) and the SSP 104 queries the SCP 116. The SCP 116 responds with a message (e.g., ForwardCall) requesting the SSP 104 route the call to the softswitch call manager pilot number. (By way of further example, the call could have been directed to a softswitch Intelligent Peripheral component to perform the same or similar function as the softswitch call manager 126).

State 6. The call manager 126 receives the call and accesses the call registry 127 to determine its current state and routing/screening instructions. The call manager 126 substantially simultaneously originates calls to the customer's landline phone 132 and mobile phone 134. The call to the landline phone 132 routes to the SSP 104. The call to the mobile phone 134 routes through the PSTN 108 to the MSC 110 (Mobile Switching Center) currently servicing the mobile phone 134. (Optionally, the call manager 126 can originate a call to the mobile phone 134 via a VoIP/SIP/ or peer-to-peer network; or via direct trunking with the mobile operator (e.g., where the mobile phone 134 is associated with a carrier MVNO or a wireless service offered by the carrier 106 (which may be a partner carrier)).

State 7. The trigger (e.g., Termination_Attempt) fires in the SSP 104 for the new call to the landline phone 132, causing the SSP 104 to query the SCP 116. The SCP 116 responds with a message (e.g., Continue) since it knows (e.g., from data accessed from the call registry) that the call manager 126 originated this call.

State 8. The SSP 104 begins ringing the landline phone 132 and the MSC 110 begins ringing the mobile phone 134 (if the mobile phone 134 is available). The call manager 126 also optionally updates the call state in the telecommunications client 136 (e.g., to "ringing").

State 9. The customer answers the mobile phone 134, causing the call manager 126 to cut the talk path through to the caller via the mobile phone 134 (e.g., bridge the call to the call manager with the call to the mobile phone 134). The call manager 126 continues to let the landline phone 132 ring up to the limit specified by the user (e.g., via a web site, telecommunications client 136, or service provider). If both phones had answered at substantially the same time, optionally the three phones would have been conferenced together. Optionally, the call manager 126 terminates calls to the landline phone 132 by notifying the SCP 116, which in turn sends a message to the SSP 104 to terminate the phone call.

State 10. The call manager 126 notifies the telecommunications client 136 of the call status change and the active call display is updated to show "connected or connected to mobile phone [number]".

State 11. The customer hangs up. The call manager 126 logs the call and updates the call frequency information for the corresponding contact. The call manager 126 also notifies the telecommunications client 136, which then clears the active call display and adds this call to the top of the call log.

At state 3 in the above example scenario, if the switch 104 supports simultaneous routing, the SCP 116 responds with a message (e.g., Continue) and requests the SSP 104 to arm other triggers. When these triggers fire, simultaneous call originations are performed by the SSP 104.

At state 9 in the above example scenario, optionally if neither phone had been answered, the call manager 126 would have prompted the caller and recorded a message if the customer's account was configured to record a message when the customer does not answer a call (e.g., within a specified number of rings).

If subscriber's account had not been configured to route calls to the landline and mobile phone at substantially the same time, optionally, the initial call routing would not have used the services of the call manager 126. For example, the call is optionally managed by the SCP 116 and SSP 104 without participation by the call manager 126 (see, for example, the third call example below and FIG. 4).

Figure 3:
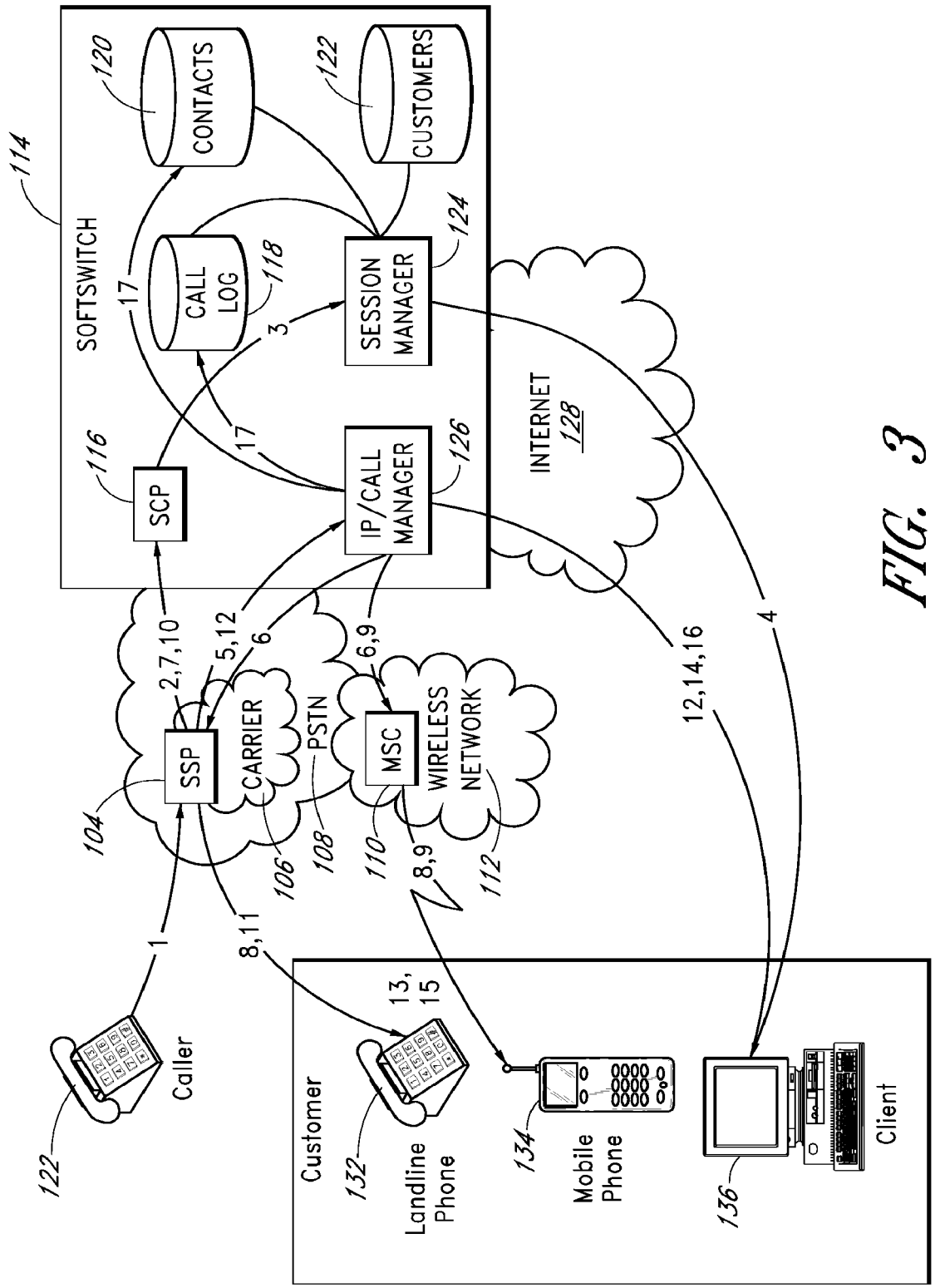
FIG. 3 illustrates a second example operating environment and example call routing service using condition monitors.

FIG. 3 illustrates an example inbound call routing scenario similar to the previous scenario, but with screening enabled. As in the prior scenario, the call routes through the call manager 126 in the softswitch 114 because AIN does not provide sufficient control of the SSP 104, in this example, to support simultaneous routing or call screening. Triggers set on a subscriber's phone address are used to facilitate communication between the carrier and the softswitch 114.

The example call handling sequence is as follows:

State 1. A caller dials the customer's landline phone number/address. The call is routed through the PSTN 108 to the carrier switch 104 (e.g., a Service Switching Point (SSP)) serving that customer's landline phone 132.

State 2. A trigger (e.g., a Termination_Attempt trigger), armed in the SSP 104 for this phone line fires, causing a message (e.g., a Transaction Capabilities Application Part (TCAP) query) to be transmitted to the configured SCP point code, which, in this example is assigned to the softswitch 114. The TCAP query includes call signaling information, including, for example, the caller phone number/address, a privacy indicator, a designation of whether the call was a forwarded call, and/or the called party phone number/address and/or other called party identifier.

State 3. The softswitch 114 verifies the called phone number is that of a customer (e.g., a subscriber of a service offered by the operator of the softswitch and/or other entity having an account associated with the softswitch), optionally by determining if the called phone number or other identifier matches a customer number or other identifier in the customer database 122 (which stores customer account records). The softswitch SCP 116 queries the softswitch session manager 124 to obtain the inbound call routing configuration (e.g., route to landline and mobile phone) for this customer and the telecommunications client presence (e.g., online or offline). In this example, the customer's client 136 is currently online. This customer has configured their service to simultaneously route calls to their landline phone 132 and mobile phone 134 with phone screening enabled. The SCP 116 responds with a message (e.g. Forward_Call) to route the call to the call manager 126. The SCP 116 also records the state of this call in a call registry in the softswitch 114 for sharing with the call manager 126.

State 4. The session manager 124 transmits a notification to the customer's telecommunication client 136 on the SCP's behalf that there is an incoming call. The telecommunications client 136 displays the call in its active call window (e.g., a call alert user interface) with the status set to "ringing". A "Take Call" button on the telecommunications client 136 is available to the customer, via which the customer can provide a call handling instruction (e.g., establish duplex communication with the caller).

State 5. The SSP 104 forwards or otherwise connects the call to the softswitch 114 (e.g. a pilot number associated with a call manager 126). The trigger fires in the SSP 104 (e.g., TnoAnswerTimer) and the SSP queries the SCP 116. The SCP 116 responds with a message (e.g., ForwardCall) requesting the SSP 104 route the call to the softswitch call manager pilot number. Instead, the call could have been directed to a softswitch Intelligent Peripheral component to perform the same or similar function as the softswitch call manager 126.

State 6. The call manager 126 receives the call and references the call registry to determine its current state and routing/screening instructions. The call manager 126 substantially simultaneously originates calls to the customer's landline phone 132 and mobile phone 134. The call to the landline phone 132 routes to the SSP 104. The call to the mobile phone 134 routes through the PSTN to the MSC 110 (Mobile Switching Center) currently servicing the mobile phone 134. Optionally instead, the call manager 126 can originate a call to the mobile phone 134 via a VoIP/SIP network or via direct trunking with the mobile operator (e.g., where the mobile phone 134 is associated with a carrier MVNO or a wireless service offered by the carrier 106 (which may be a partner carrier)).

State 7. A trigger (e.g., Termination_Attempt) fires for the call to the landline phone 132 causing the SSP 104 to query the SCP. The SCP references the Call Registry and responds to the SSP 104 with a message (e.g., Continue).

State 8. The SSP 104 begins ringing the landline phone 132 and the MSC begins ringing the mobile phone 134 (if the mobile phone 134 is available). The call manager 126 also optionally updates the call state in the Telecommunications client, e.g., to "ringing".

State 9. In this example, the customer configured interval for ringing prior to screening mode elapses without either phone answering. This causes the call manager 126 to end the calls to the landline and mobile phone and to re-originate a call to the landline and mobile phone. For the call to the mobile phone the caller ID is optionally set to a pilot number association with the softswitch for which the mobile phone has been programmed to play a distinctive screening mode ring tone (optionally selected by the customer). If the mobile phone is determined to be unavailable, for example via a query to a Home Location Register (a database of subscriber information for a mobile network) serving the mobile phone or Machine Answer Detection, the call manager 126 would not re-originate a screening call back to the mobile phone 134.

State 10. The trigger (e.g., Termination Attempt) fires in the SSP 104 and the SSP 104 queries the SCP. The SCP responds with a message (e.g., Authorize_Termination) with the distinctive screening mode ring tone specified. The SSP 104 also updates a call registry to indicate screening is active for this call.

State 11. The SSP 104 proceeds to alert the landline phone 132 using the distinctive ring tone.

State 12. Since the call is now in screening mode, the call manager 126 plays the customer's greeting (e.g., a canned greeting or a greeting prerecorded by the customer that requests the caller to leave a message) to the caller in preparation for recording a message. The call manager 126 also transmits a notification the customer's telecommunication's client instructing the client to update the status to "greeting caller".

State 13. The customer answers the landline phone 132. The call manager 126 opens a one-way talk path so the customer can listen to the caller leaving a message but not vise versa (half duplex communication). Under the call processing configuration in this example, if one phone is answered and the other phone is not, the leg to the unanswered phone is dropped. Thus, because the mobile phone 134 has not yet been answered in this example, the call manager 126 disconnects the mobile phone 134 from the call (e.g., drops the leg of the call to the mobile phone 134). Optionally instead, the call processing configuration can specify that the call manager 126 shall continue ringing the mobile phone 134 until the call is forwarded to voice mail, at which point the call manager 126 disconnects the call to the mobile phone 134.

State 14. The call manager 126 optionally notifies the telecommunications client 136 to update the call status to "screening" and it establishes an audio stream to the telecommunications client 136 so that the call can be screened via the client 136 as well.

State 15. The customer presses the 1 key (or other appropriate control) on the landline phone 132 to take the call. When the call manager 126 detects the key press (e.g., the corresponding DTMF), the call manager 126 opens a two-way talk path (full duplex) between the caller and the landline phone 132.

State 16. The call manager 126 optionally notifies the telecommunications client 136 to change the call status to "connected".

State 17. The caller hangs up. The call manager 126 logs the call and updates the call frequency information for the corresponding contact. The call manager 126 optionally also notifies the telecommunications client 136 of the call termination, and the client 136 then clears the active call display and adds the terminated call to the top (or otherwise indicates the call is the most recent terminated call) of the call log.

Note in this example scenario, the landline phone and mobile phone are both rung substantially simultaneously, and after a configured "no answer" interval, the landline phone and mobile phone switch to a distinctive ring tone signifying screening. Optionally, the landline phone and the mobile phone can have different ring tones to signify screening. Then, when either phone is answered, a branding tone is optionally played to the customer to further emphasize the call state, followed by the streaming of a message being left by the caller to the answered phone. If the two phones were answered, they would both be optionally conferenced into the screening session and the called party can hang up, monitor the call, or take the call.

In this example scenario, when the initial call was received at the mobile phone, the user could have optionally pressed "ignore" or "do not disturb" (e.g., via a corresponding key press, such as "1" or "2", or via a menu entry displayed via the phone display) to cause substantially immediate forwarding back to the softswitch, and thus expedite the transition into screening mode. This would also cause the SCP/SSP to accelerate the transition to screening on the landline phone.

Figure 4:
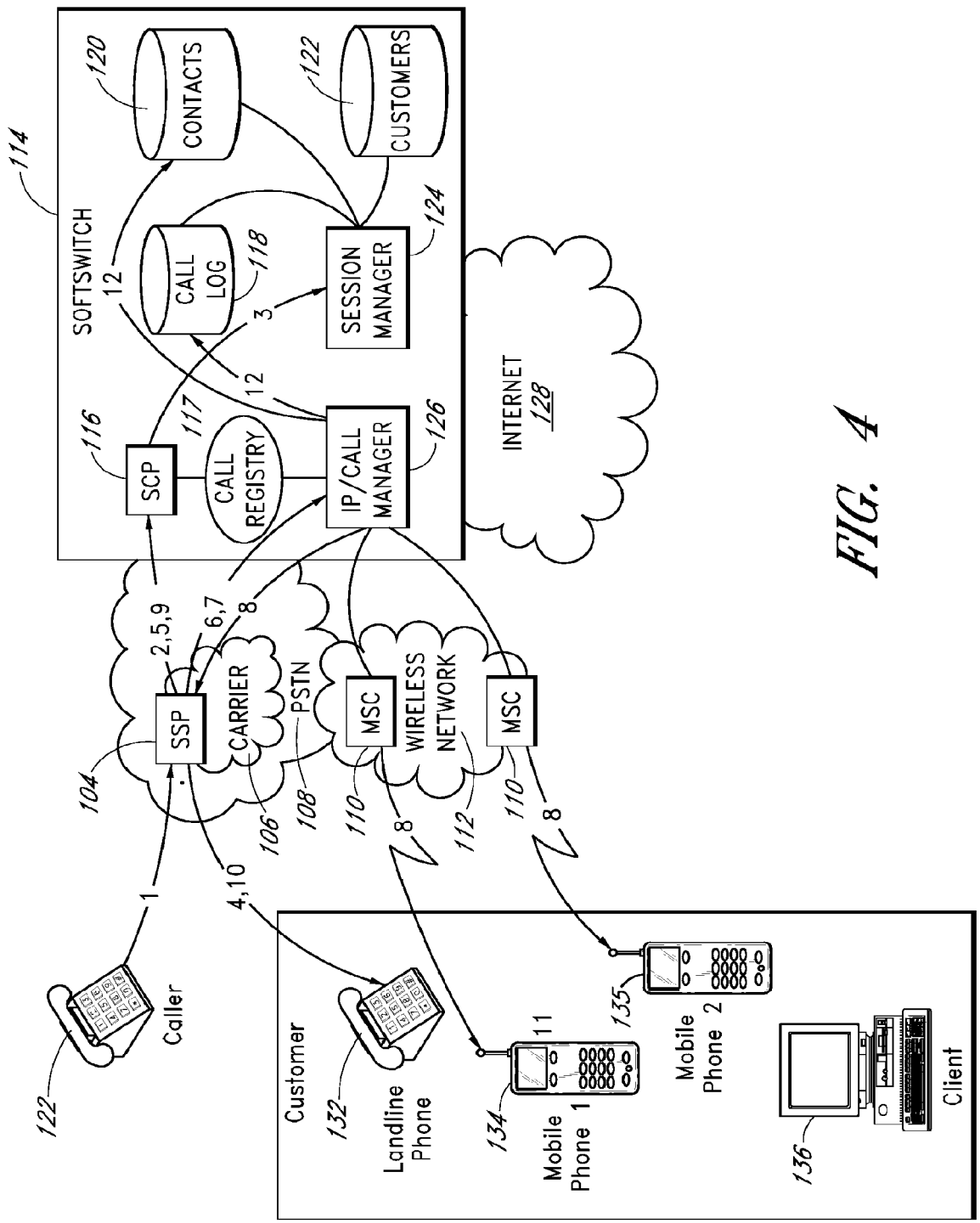
FIG. 4 illustrates a third example operating environment and example call routing service using condition monitors.

Inbound routing of a call to telephonic devices having different assigned priorities will now be described. FIG. 4 illustrates an example scenario in which the customer has a landline phone 132 and two mobile phones 134, 135, one phone 134 from a CP MVNO, and the other phone 135 from another non-CP MVNO wireless carrier. The landline phone 132 has highest routing priority in this example configuration and is therefore rung first. In this example, the customer's personal computer-hosted telecommunications client is offline and thus is not involved in the call.

The example call handling sequence is as follows:

State 1. A caller dials the user/customer's landline phone number/address. The call is routed through the PSTN 108 to the carrier's switch 104 (e.g., a Service Switching Point (SSP)) serving that customer's landline phone 132.

State 2. A trigger (e.g., a Termination_Attempt trigger), armed in the SSP 104 for this phone line fires, causing a message (e.g., Transaction Capabilities Application Part (TCAP) query) to be transmitted to the configured SCP point code, which, in this example is assigned to the softswitch 114. The TCAP query includes call signaling information, including, for example, the caller phone number/address, a privacy indicator, a designation of whether the call was a forwarded call, and/or the called party phone number/address and/or other identifier.

State 3. The softswitch 114 verifies the called phone number or other identifier is that of a customer (e.g., a subscriber of a service offered by the operator of the softswitch 114 and/or other entity having an account associated with the softswitch), optionally by determining if the called phone number or identifier matches a customer number or identifier in the customer database 122 (which stores customer account records). The softswitch SCP 116 queries the softswitch session manager 124 to obtain the inbound call routing configuration (e.g., route to landline and mobile phone 134) for this customer and the telecommunications client presence (e.g., online or offline). In this example, the customer's client 136 is currently offline. This customer has configured their service to simultaneously route calls to their landline phone 132 and secondary simultaneous routing to two mobile phones 134 with phone screening enabled.

The SCP 116 then responds to the SSP query with a message (e.g., Continue). In this response it also requests the SSP 104 to arm a trigger, for example T_No_Answer, and to set a timer (e.g., TnoAnswerTimer) to the customer configured value for ringing prior to the transition to screening mode.

State 4. When the SSP 104 receives the response from the SCP 116, the SSP 104 begins ringing the landline phone 132.

State 5. In this example, the customer does not answer the landline phone 132 before the timer (e.g., T_No_Answer) fires and the SSP 104 queries the SCP. The SCP 116 responds with a message (e.g., Forward_Call) to route the call to the call manager 126 and it records the state of the call in a call registry.

State 6. The SSP 104 forwards the call to the call manager 126 or the call manager pilot number. The trigger fires in the SSP 104 (e.g., TnoAnswerTimer) and the SSP 104 queries the SCP 116. The SCP 116 responds with a message (e.g., ForwardCall) requesting the SSP 104 to route the call to the softswitch call manager pilot number. As similarly discussed above, the call could have instead been directed to a softswitch Intelligent Peripheral component to perform the same or similar function as the softswitch call manager 126.

State 7. The call manager 126 receives the call and references the call registry to determine the call's current state indicating that the call is to be screened. The call manager 126 plays the customer's greeting (e.g., a canned greeting or a greeting prerecorded by the customer) to the caller in preparation for recording a message.

State 8. The call manager 126 substantially simultaneously originates calls to the customer's landline phone 132 and mobile phones 134, 135. The call to the landline phone 132 routes to the SSP 104. The calls to the mobile phones 134, 135 route through the PSTN 108 to the corresponding servicing MSC 110 (Mobile Switching Center). As similarly discussed above, optionally, the call manager 126 can originate a call to the mobile phone via a VoIP/SIP network or via direct trunking with the mobile operator (e.g., where the mobile phone 134 is associated with a carrier MVNO or a wireless service offered by the carrier 106 (which may be a partner carrier)).

State 9. A trigger (e.g., Termination_Attempt) fires for the call to the landline phone 132 causing the SSP 104 to query the SCP 116. The SCP 116 responds with a message (e.g., Authorize_Termination) with the specified distinctive screening mode ring tone.

State 10. The SSP 104 begins ringing the landline phone 132 and the MSCs 110 begins ringing the corresponding mobile phones 134, 135 (for the mobile phones that are available).

State 11. The customer answers mobile phone 134 and optionally hears a branding tone indicating a screened call. When the answer indication reaches the call manager 126, the call manager 126 opens a one-way talk path so the customer can listen to the caller leaving a message but not visa versa (in half duplex mode, for example where the return talk path from the customer phone 134 to the caller is muted). Optionally, because the mobile phone 135 has not yet answered the call, the call manager 126 disconnects it from the call (e.g., drops the call leg to the phone 135). Alternatively, the call to mobile phone 135 can continue to ring, and if answered, enters screening mode as described above. Optionally, either mobile phone user can monitor the call, even if one of the mobile phone user's takes the call (so that the call is in full duplex mode to the phone of the user that took the call, and the call is in half-duplex mode to the other phone). The second mobile phone can then enter (conference) into the call by subsequently entering a key press 1 (or other appropriate control). Similarly, a landline phone user can also monitor and conference into a call if a mobile phone user answers a call.

State 12. The caller hangs up. The call manager 126 logs the call and updates the call frequency information for the corresponding contact. The next time the customer has a telecommunications client that is brought online, the client will synchronize the call log data with that stored in the call manager 126, and this new call will be shown in the call log displayed via the client. The updated call log can also optionally be accessed via a Web site that makes such call log data available.

Note that in this example scenario the two mobile phones 134, 135 go substantially immediately into screening mode when they first receive and answer the call because they are in a secondary routing position. In this example embodiment, because the caller ID associated with the call is that of the caller rather than the call manager 126, the two mobile phones 134, 135 do not play the distinctive ring tone associated with calls received from calls with the caller ID associated with the call manager 126. However, when they answer their respective phone, the system optionally plays a branding tone indicating that screening is in effect.

There may be service and cost advantages to the service provider particularly in the case of the MVNO mobile phone user. For example, before extending the call to the mobile phone under the MVNO, the service provider may access the Home Location Register (HLR) of the wireless service provider to determine the status and routing of the mobile phone, and if the mobile phone is not available, the service provider optionally will not attempt to ring the mobile phone. Further, the service provider can configure distinctive ringing for screening and call forwarding to the CP softswitch to unify call answering services across landline and wireless networks.

Figure 5:
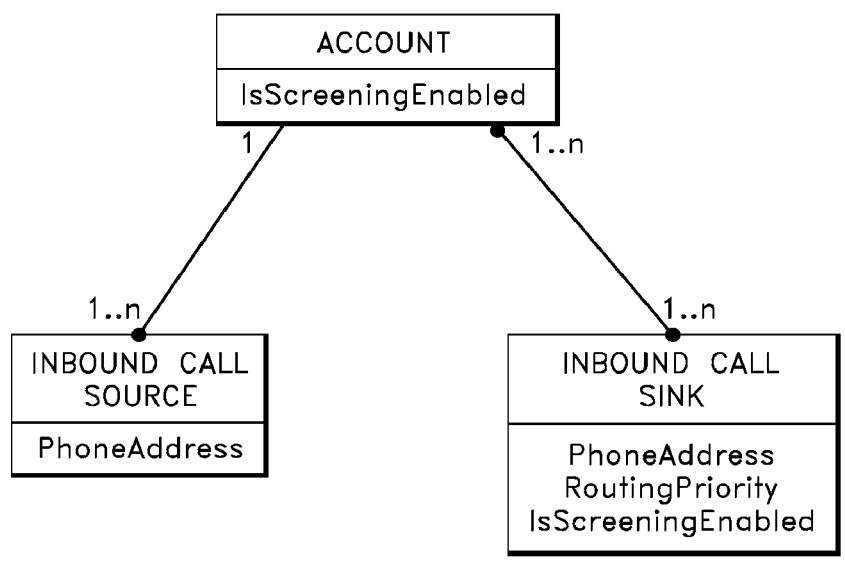
FIG. 5 illustrates an example call routing services object model.

The service provided to a customer involves the use of some or all of the following: a landline phone, one or more mobile phones, and one or more telecommunication clients. The service may be provided under a single account, and additional sub-accounts may be created to provide call log/message separation in multi-member households or businesses (e.g., were a given member is associated with a sub-account), or separate accounts can be created for multiple household or business users. FIG. 5 illustrates an example service structure model.

Associated with a given account are one or more Inbound Call Sources and one or more Inbound Call Sinks. A Source is a phone address in the network, which when called, potentially routes to the softswitch to provide telecommunication services, such as enhanced services. By way of example, the phone number of the customer's landline phone can be a Source, which can be configured with AIN triggers (e.g., as described herein), and in effect, generally routes to the softswitch when so configured. Another example Source is the customer's mobile phone number, wherein calls to the mobile phone number can be forwarded to the softswitch on busy and no answer conditions, or for all calls if so specified by the subscriber, by way of example.

Inbound Call Sinks include customer specified destinations as to where the softswitch should attempt to route inbound calls. Optionally, a given destination has a phone address (e.g., a E.164 phone number, a SIP address, a Skype address, or other telephonic destination address), and a routing priority (which can be a default priority or set by a customer) to indicate which Sink(s) try first, second, third, etc. Referring to FIG. 5, an IsScreeningEnabled attribute indicates whether screening is enabled during call delivery. If screening is enabled for the account, screening may be enabled or disabled at the individual Sink level (e.g., by the subscriber via an account configuration user interface accessed via the telecommunications client, a widget, a gadget, a Web page or otherwise).

Optionally, an Inbound Call Source with a particular phone address may be restricted from being associated with more than one account. An Inbound Call Sink with a particular phone address may be associated with multiple accounts.

Additional discussion is provided below regarding examples of how individual objects used by the customer relate to this model.

For a customer's main account, optionally, there is a serviced landline phone with a carrier (e.g., a CP) assigned phone number. It is implicitly an Inbound Call Source. The inbound call activity for this phone line is monitored by the softswitch (e.g., via AIN triggers in a CP switch or SSP). This phone is typically also an Inbound Call Sink, although for certain customers it may not be a Call Sink. A landline can also be a Source for a sub-account.

The customer may use one or more mobile phones (e.g., from an MVNO) as part of this service. If the mobile phone is configured to forward to the softswitch on a busy condition, a no answer condition, and/or other condition, the mobile phone is an Inbound Call Source. A given mobile phone/address may be a Source for the main account and/or it may be a Source for a sub-account. If the mobile phone/address is a Source for the main account, calls/messages resulting from direct calls to this phone's Mobile Device Number (MDN) are optionally logged in the main account, wherein a user with sufficient privileges can view a call log associated with the main account and sub-accounts. Optionally, a main account user can specify which household or business members can view which call logs associated with the main account and one or more sub-accounts.

A mobile phone may also be an Inbound Call Sink. Optionally, a given mobile phone is preconfigured by the MVNO or otherwise with distinctive ring tones (e.g., 1 or 2 ring tones) that are used when a call is being presented from specific caller IDs used by the softswitch when routing calls to the phone in screening mode. Optionally, one ring tone is silence, which may be selected and used by users that prefer not to hear any audible ringing when a call is being presented the second time in screening mode. The preconfiguration of the phone optionally also includes a phone contact list entry with the MVNO chosen name for branding screened calls.

The MVNO optionally configures a given mobile phone to forward to the softswitch (e.g., when certain conditions occur, such as busy, or ring-no-answer) at the time of purchase, or optionally before or after the time of purchase.

The customer may use one or more mobile phones from other wireless carriers as part of this service. Similar to an MVNO mobile phone, such a phone (also referred to as a bring-your-own (BYO) mobile phone) can be configured by the customer to forward to a softswitch on a busy and no answer, and thus the BYO mobile phone can become an Inbound Call Source. The customer is optionally provided with instructions (e.g., stored on the mobile phone, in a printed manual, on an optical disk, via a Web site, via a text message notification, etc.) on how to use feature codes to do this forwarding.

A BYO mobile phone may also be an Inbound Call Sink. The customer is optionally given instructions on how to configure a ring tone to be used when the softswitch calls in screening mode and how to establish a suitable contact name in their phone for such calls. If they choose not to make this configuration change, they will still receive a distinctive caller ID (e.g., the call manager pilot hunt group number).

If a BYO mobile phone is a Sink but not a Source, calls that are routed to the mobile phone and not answered may be forwarded to a call answering device for answering. Optionally, when the softswitch detects machine-answering, it disconnects from that device so that the softswitch can continue with the configured call routing and not leave an inadvertent message on the recording device.

The customer may configure a SIP address (or other voice over the Internet address) as an Inbound Call Source or an Inbound Call Sink. An Inbound Call Source phone number for an account is implicitly given a SIP address (e.g., "sip: <phoneNumber>@callwave.net>") making it reachable for inbound calls via SIP Federation phones. (Optionally other IP phone addresses, such as a Skype address, can be configured as an Inbound Call Source or an Inbound Call Sink.)

As discussed above, a customer may optionally install a telecommunications client on one or more Personal Computers (PC) or other appropriate terminals (e.g., a smart phone). The PC client is used to review logged calls/messages, track associated contacts, screen/route inbound calls, and take calls directly on the PC. More than one instance of the PC client may be online at the same time. The PC client is implicitly an Inbound Call Sink when it is online.

As similarly discussed above, at the option of the customer, sub-accounts may be created. For example, sub-accounts may be setup for various users if there are multiple mobile phone users within the household (or small business) so that calls/messages are optionally logged separately for each user, wherein a given sub-account has an associated log for calls to or from the user associated with the sub-account.

A sub-account is modeled as similarly discussed above with respect to the main account. The individual's mobile phone can be an Inbound Call Source for the sub-account. The mobile phone can also be an Inbound Call Sink (and the mobile phone can also be a Sink for the main account). Other phones, such as the main landline phone, could also be a Sink for the sub-account. Optionally, if a call originally made to the MDN of the mobile phone were eventually taken on the landline phone, where the mobile phone is associated with a sub-account and the landline is associated with a main account, the call is logged in the sub-account rather than in the main account. In other embodiments, the call is also or instead logged in the main account log.

A sub-account may install its own instances of the telecommunications client. Optionally, only calls directed specifically to the Inbound Call Sources for the sub-account are accessible from that account's client instances; however the user of the main account may choose to move logged calls from that account to selected sub-account. Optionally, instead, calls directed specifically to the Inbound Call Sources for a given sub-account are presented in the log on a specified different sub-account and/or the main account.

In-bound automatic call routing will now be further discussed. The "owner" of an account (main or sub-account) can configure its Inbound Call Sources and Sinks. For a given Sink, a routing priority is specified (e.g., Primary, Secondary, Tertiary, etc.). Optionally, the owner is restricted in the number of priority levels that may be used (e.g., 2 priority levels). The softswitch routes an inbound call first to Primary Sinks, then to the Secondary Sinks, then to Tertiary sinks (if any).

There may be multiple sinks for a given priority level (e.g., multiple Primary and multiple Secondary Sinks). If there are multiple sinks, when routing a call to Sinks associated with a given priority level, the softswitch optionally routes to all such Sinks substantially simultaneously, although the Sinks may not all start ringing at the same time (e.g., mobile phones typically take longer to connect and so longer to ring than a landline phone).

The time or ring interval for transitioning from Primary to Secondary Sinks is optionally configurable (via Telecommunications client and/or web site) by the account owner (optionally, the interval can default to a certain value, such as three rings). Optionally, the Primary Sinks are also rung during secondary routing. Optionally, each of the account's PC clients that is online is implicitly a Primary Sink.

Manual routing of a call using a telecommunications client (or other user interface) will now be described. When an inbound call is delivered to a telecommunications client (e.g., a telecommunications PC client), the information about the caller (including but not limited to some or all of the following: call signaling information, name, number, city/state, email address, SIP address, etc.) is presented visually to a user. In addition, a Take Call button is optionally provided for acting upon the call. When clicked, it presents the configured Inbound Call Sinks to choose from, which may include the client host itself.

An Inbound Call Sink may be optionally restricted to being applied only during a specified time interval, for example, during specified days of the week, and/or during specified dates, and optionally only when the given Inbound Call Source that is a mobile phone is detected as being off or out of range. Typically, this may be particularly useful in sub-accounts (e.g., account owner turns mobile phone off when arriving home from work, and then the account owner wants calls to that phone's MDN to route to the landline phone during the hours of 5:00 to 9:00 p.m., Mondays-Fridays, and after 9:00 PM, the account owner wants a message to be taken and calls not to be routed to the account owner's phones). Thus, the user may be presented with a routing form wherein the user can specify call treatment (e.g., call routing destination(s)) when a certain condition occurs (e.g., mobile phone off and/or unavailable), for specified time periods and/or dates. Routing rules can also optionally be configured by the service provider or by the service provider on behalf of the user (e.g., when a customer calls into customer service, when a customer first purchases a mobile phone, etc.).

Call screening may be enabled/disabled by the account owner for the account as a whole. If it is enabled for the account, it may be further enabled/disabled for individual Inbound Call Sinks.

The model used here for screening is that an inbound call is routed first to the Primary Sinks. If none answer after a customer configurable interval (with an optional default, such as three rings or 5 seconds), the call is then optionally re-presented to the Primary Sinks and Secondary Sinks. If screening is enabled for the given Sink, the second presentation is optionally in conjunction with a distinctive ring tone associated with screening. If screening is disabled, a normal ring tone is used. The distinctive ring tone is chosen from among those supported in the AIN interface.

A Secondary Sink may be configured to not have distinctive screening ring tone during the initial call to it (wherein the caller's caller ID is included in the caller ID signaling information rather than a callerID associated with the system routing the call). In this case, if the initial call to the Secondary Sink is not answered and no other phone takes the call, the call is optionally re-presented to this Sink in screening mode.

Optionally, the caller ID can include portions of the calling party phone number and a number/text associated with the call manager (e.g., a pilot number).

At substantially the same time secondary routing begins, the caller is prompted (e.g., via the call manager) to leave a message. If a non-screening phone then picks up (e.g., where the call is presented to the phone without call screening), that user will substantially immediately be connected in full-duplex mode to the caller, even if the caller is in the midst of being prompted or leaving a message. If a screening phone picks up, branding tone is optionally played to the user, and then the user can hear (e.g., in half-duplex mode) the caller leaving a message. At an online PC client that has screening enabled with automatic presentation, no action is required by the user for screening to begin (e.g., a message being left by the caller is streamed to the PC client and is automatically played via the PC client host's speakers).

During a screened call, the listener can elect to take the call. From a phone, this is done by pressing the 1 key (or other appropriate control), and the listener will be connected to the calling party in full-duplex mode. A user can take the screened call via a telecommunications client (e.g., via a telecommunications PC client) by clicking a "Take Call" control or providing other appropriate user action. If the listener hangs up, optionally the caller's recording of a message is not affected, and the user can later play back the recorded message.

The user of a mobile phone can expedite the transition into screening mode by pressing the phone's "ignore" or "do not disturb" key (e.g., dedicated keys, specified number keys, soft keys, a menu selection, etc.), which causes the mobile phone to immediately forward the call back to the softswitch. This feature is available if the mobile phone is configured with forwarding to the softswitch.

As described above, BYO mobile phone users can program their own phone to have a distinctive ring tone for screening, users can bring their BYO mobile phone to a service center to have it so programmed, or, in certain cases, the phones can be remotely configured over the phone network.

As previously discussed, the customer may have one or more instances of the telecommunications client correspondingly installed on one or more terminals (e.g., personal computers, smart phones, interactive televisions, etc.). One or more of the client instances may be simultaneously online.

Figure 7:
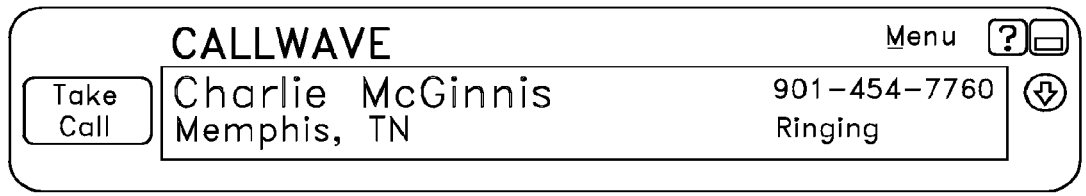
FIG. 7 illustrates an example inbound call alert displayed on a telecommunications client interface.

When an inbound call is detected by the softswitch, the call is presented to the customer's telecommunication client instances that are online, as illustrated in FIG. 7. As previously discussed, as part of call presentation, a ringing sound is played by the client host.

The call is presented in the telecommunication client's active call user interface window. The information presented includes some or all of the following: the caller's phone number, phone type, name (if known), and city/state location. In addition, the call status is displayed as it progresses (e.g., Ringing, Greeting Caller, Recording Message, Connected). The call is screened once it advances to Greeting Caller or Recording Message status if the customer has screening enabled on the telecommunications client. If the call is taken on the landline or mobile phone prior to screening, the call is optionally removed from the active call window.

Figure 8:
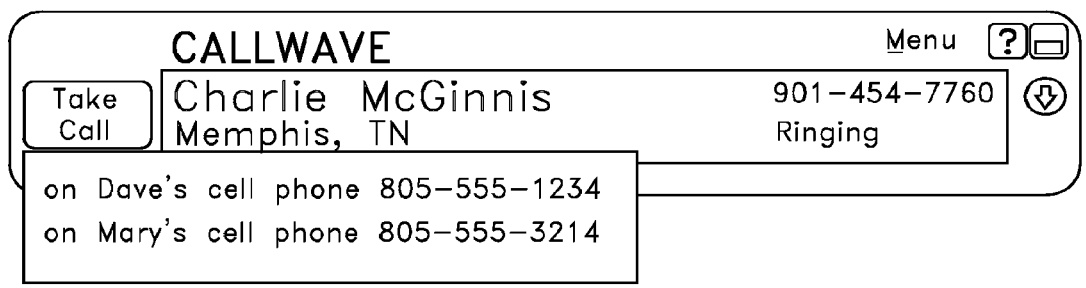
FIG. 8 illustrates an example drop down menu displaying optional phone/number addresses for routing calls.

The customer can choose to take the call by activating a "Take Call" control. If multiple "take call" destinations are configured by the customer, a drop-down menu is optionally presented, via which the customer can select (e.g., by clicking on a selection) where to take the call, as illustrated in the FIG. 8 (although other user interfaces can be used as well).

Figure 9:
FIG. 9 illustrates an example active bridged outcall displayed on a telecommunications client interface.

When a take call destination is selected, the call is routed to the selected destination and optionally the Take Call button changes to End Call as illustrated in FIG. 9. This button transition occurs when the message status changes to Connected, such as when someone at the landline phone takes the call.

If an "End Call" button is clicked, the legs of the call are ended substantially immediately by the call manager. Otherwise, the call continues to be displayed until the call ends (e.g., as result of one of the two parties hanging up), unless another call arrives. If another call arrives when the call status is Connected, optionally the new call takes precedence and it is displayed instead of the old call (or in addition to the old call if the user interface supports the display of more than one call, such as when the call is taken on via a personal computer).

Figure 10:
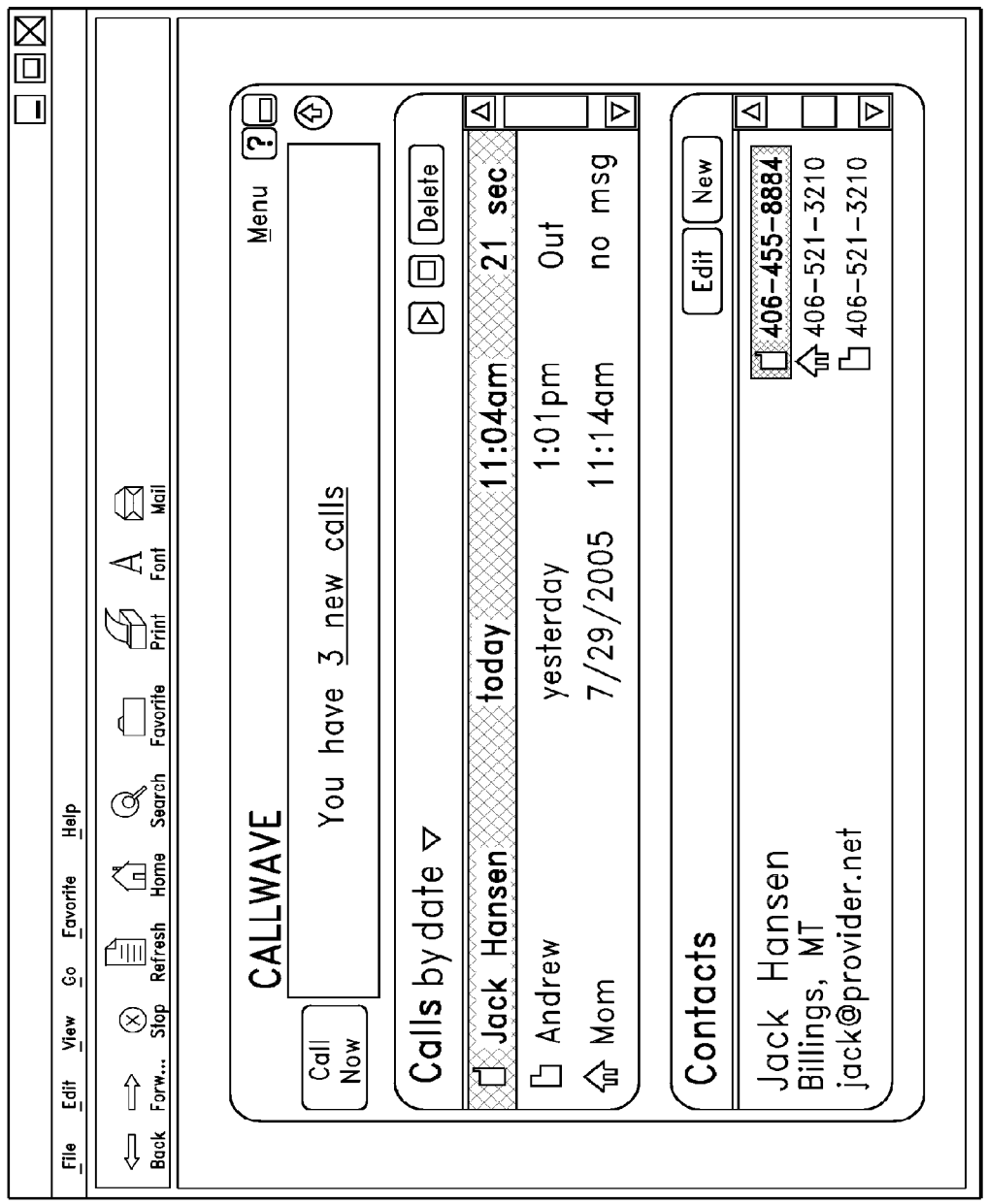
FIG. 10 illustrates a second example user interface of a call log displayed via a web browser.

While the previous example illustrates user interfaces provided via a dedicated telecommunications client, other user interfaces can be used. Optionally, a customer can also access such user interfaces via a browser. FIG. 10 illustrates another example call log user interface presented via a browser to a customer. The browser can be executing on a computer terminal, such as a personal computer, a browser or Wireless Application Protocol (WAP)-enabled phone, a PDA or the like. The call log can be accessed by supplying the appropriate URL to the browser and optionally providing log-on information, such as a user name and a password. Clicking on the name or number can create a bridged, return call for example.

Figure 11A:
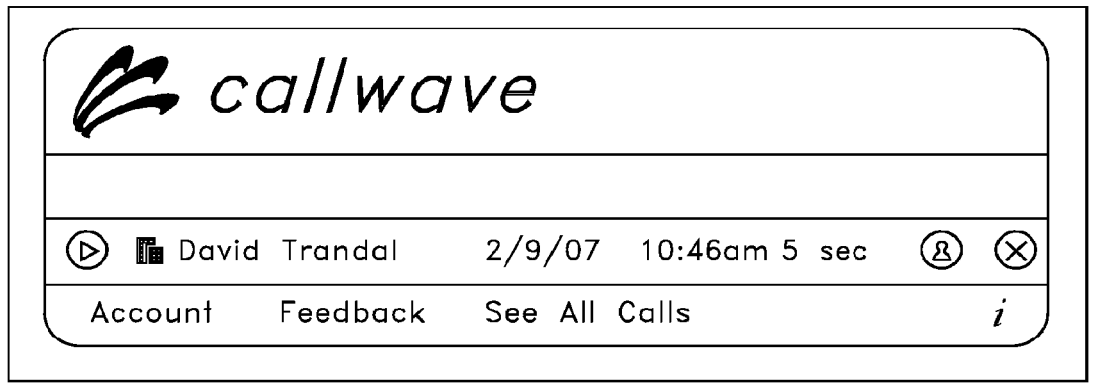
FIGS. 11A-B illustrate another example user interface.

FIG. 11A illustrates the example widget user interface displaying call information for the most recent received call. The user interface includes the name/identifier (if available) of the caller, the date of the call, the time of the call, and the connect time, length of message left (if any), or length of fax received (if any). An expand control is provided to expand the size and/or amount of information displayed. An account control is provided, which when activated causes an account management Web page to be presented. A feedback control is provided which, when activated, causes a form to be presented via which the user can submit feedback to the system operator/provider (e.g., like and dislikes regarding the system and services, problem issues, etc.), access a help interface, and/or access answers to frequently asked questions. A "see all calls" control is provided, which when activated, causes the user interface to list numerous past calls (e.g., all past calls, all past call received in a certain time period whose entries have not been deleted, a certain number of past calls, etc.), optionally in a scrollable user interface.

Figure 11B:
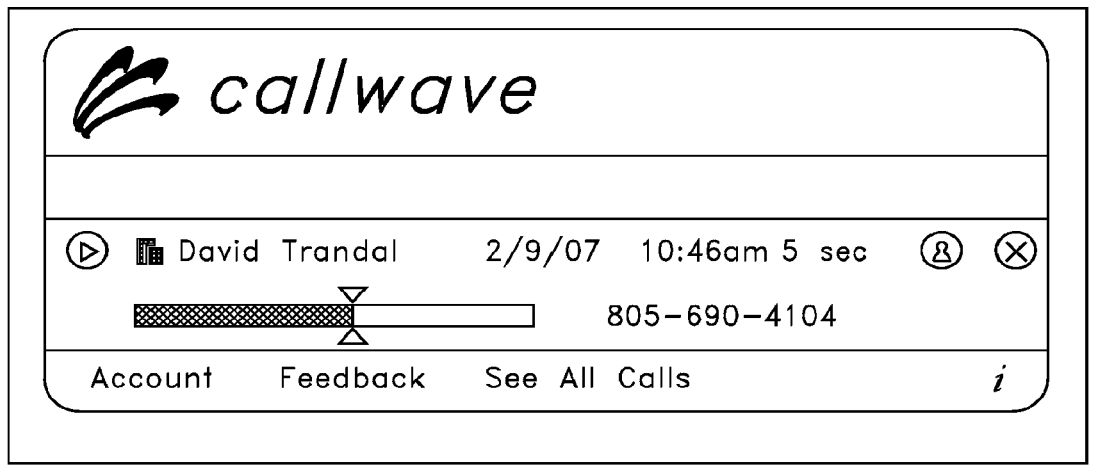

FIG. 11B illustrates an example expanded version of the user interface illustrated in FIG. 11A. The example view displays the calling number (if available) and a message playback status bar.

The softswitch optionally sends an MWI (Message Waiting Indicator) update to the switch servicing the customer's landline phone when there is a change in the count of messages not yet played back by the customer (e.g., unreviewed messages). This update is sent using, for example, AIN facilities. The update indicates whether the MWI is to be activated or deactivated. The SSP appropriately stores the new MWI state and applies it to the phone (e.g., stutter dial tone or lamp).

In addition, the softswitch can be configured to send MWI updates to the wireless carrier with which the partner carrier has an MVNO relationship or wireless network operation. This MWI can be sent using TCAP/IS-41 or the SMPP protocol by way of example and not limitation. The MWI update controls a message waiting icon on the phone's screen (or other indicator) to appropriately indicate whether the customer has unreviewed messages.

In the telecommunications client, there are optionally one or more of the following MWI-related mechanisms (which need not all be provided):

An icon blinks when there is a new call, regardless of whether there is an associated message.

The number of new calls is summarized in the active call window, when there is no call active.

The new calls in the call log are highlighted (e.g., using a different color, bolding the new call entries, providing a new call icon, or otherwise).

In addition, the customer can configure the customer's account so that an SMS message and/or email message is transmitted to the customer when there is a new message.

Figure 6:
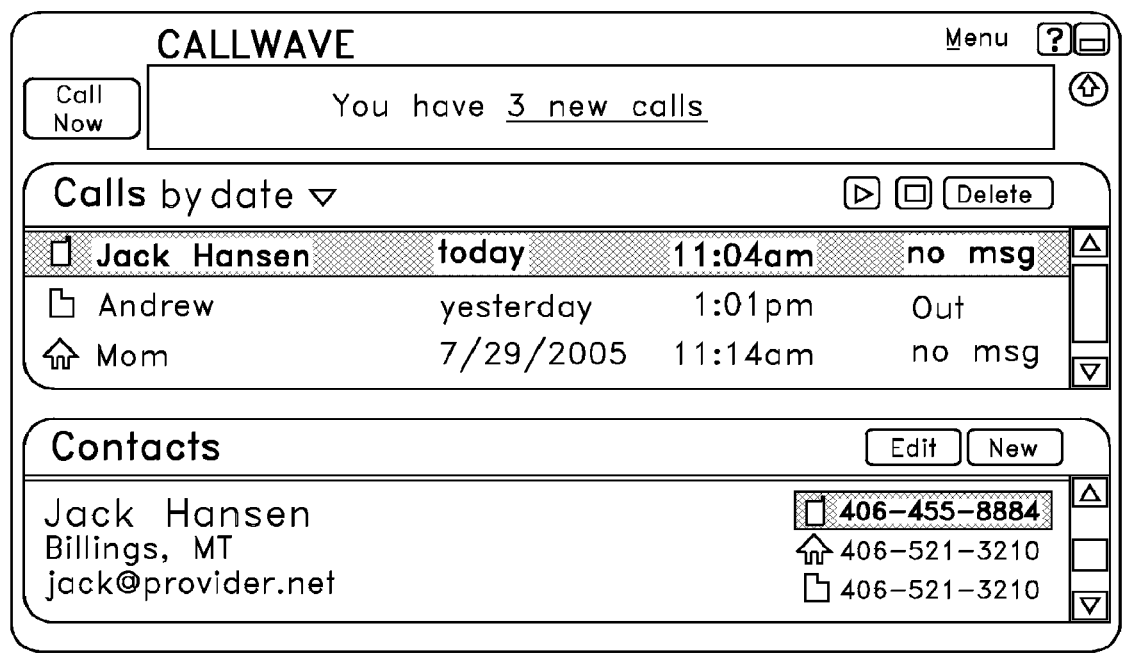
FIG. 6 illustrates a first example telecommunications client user interface of a call log and user contacts.

Optionally, the telecommunications client can be displayed in thin bar or narrowed format or in expanded format. In expanded mode, the telecommunications client has an area (e.g., a window) for logged calls and another area for contacts. The first contact displayed corresponds to the currently selected call, as illustrated in the FIG. 6.

Calls with messages are optionally indicated with a length indication in the last column. In the illustrated example, a message is reviewed by double-clicking it or by clicking the play icon.

From the telecommunications client associated with a main account, the user may request to move a call log entry to a sub-account. A menu (e.g., a drop-down menu) lists the sub-accounts from which to select. Once this action is completed, the call is removed from the displayed call log for the main account and it is moved to the sub-account. (Optionally, a call can be included in a main account log and a sub-account log, wherein the call information between the two logs is synchronized.) If the sub-account does not have a corresponding telecommunications client online, the moved call is displayed as a new missed call the next time the corresponding telecommunications client is brought online. If the corresponding telecommunications client is currently online, the moved call is displayed in the call log the next time that the corresponding telecommunications client synchronizes with the softswitch (e.g., less than two minutes or other specified period).

When a call is moved to a sub-account, the configured message waiting notification is performed for that sub-account.

A telephone user interface is provided for the owner of an account to access voice messages and optionally fax messages. The corresponding carrier (e.g., a CP) may optionally configure password entry as not required when the account owner is calling from a phone that is configured as an Inbound Call Source.

During message review, new messages are optionally presented first followed by saved messages. Messages are presented in FIFO order or LIFO or any other order specified by the service provider. A new message can be optionally skipped, saved, or deleted. Saved messages can be optionally skipped or deleted.

An account owner may optionally configure greetings (e.g., a greeting that asks the caller to leave a message, and optionally states the called phone number called and/or a name of a user associated with the phone number) for use when the caller is being requested to record a message, such as from the following greeting types:

Standard system greeting (optionally, this is the default greeting).

Greeting containing a recorded spoken name.

Complete custom recorded greeting.

The greeting is recorded using a phone/VoIP equipped computer (e.g., by dialing a specific pilot number or as part of the message review telephone user interface) or otherwise.

A call detail record is logged in the softswitch for a given inbound call and for a given associated attempt to route the inbound call to an Inbound Call Sink. The logged data includes some or all of the following call signaling information: called/calling party data, time of call, length of time connected, and reason for ending call, by way of example. These call detail records, or selected data therefrom, can be provided to the carrier for billing if needed.

By way of example, and not limitation, the converged routing processes described herein can operate in the following example carrier environments wherein the carrier (e.g., a carrier CP):

Identifies which customers are to have the converged routing service enabled and for each identifies the point code of the SSP serving their landline.

Sets the trigger (e.g., Termination_Attempt) for inbound calls for the serviced landline phones and directs the associated TCAP queries to the point code of the SCP.

Enables the SSP's to receive MWI updates from the softswitch for landline phones.

Preconfigures MVNO mobile phones with distinctive ring tones for screening.

Configures MVNO mobile phones with forwarding to a softswitch pilot number on busy and no answer if the customer wants it integrated with this service.

If MWI service to be provided for the MVNO mobile phones, establish agreement with wireless carrier for sending updates via TCAP/IS-41 or the SMPP protocol.

Establish means to receive call detail records from the softswitch if needed for calls that are not originated in the carrier's SSP.

Other patent applications referenced herein describe the use of AIN triggers for related call management functions—call logging, call screening, privacy management, personalized caller name, and bridged outcalls. These call management capabilities, including the ones described in this document, optionally make use of a telecommunications client or a browser to provide a customer with visual access to calls.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of call processing, the method comprising:
   accessing a first account at a call processing system wherein the first account has an associated: first phone address and a second phone address associated with a primary account, a third phone address associated with a first secondary user account wherein the first secondary user account includes at least a fourth phone address, and a fifth phone address associated with a second secondary user account, wherein the first secondary user account further includes a sixth phone address;
   receiving over a network at the call processing system a first call directed to the third phone address, and at least partly in response:
      generating a first outbound call to the fourth phone address, and at least partly in response to determining that the first outbound call is not timely answered:

generating a second outbound call to the second phone address, and logging the status of the first call in a first secondary user call log wherein the first call is not logged to a primary account call log;

receiving over the network at the call processing system a second call directed to the fifth phone address, and at least partly in response:

generating a third outbound call to the sixth phone address and at least partly in response to determining that the third outbound call is not timely answered:

generating a fourth outbound call to the sixth phone address, and logging the status of the second call in a second secondary user call log wherein the second call is not logged to the primary account call log;

receiving over the network at the call processing system a third call directed to the first phone address, and at least partly in response:

generating a fifth outbound call to the second phone address; and logging the status of the third call in the primary user call log.

2. The method as defined in claim 1, wherein the second phone address is associated with a shared landline.

3. The method as defined in claim 1, wherein the fourth phone address is associated with a first user and a first wireless line and the sixth phone address is associated with a second user and a second wireless line.

4. The method as defined in claim 1, the method further comprising: at least partly in response to determining that the second outbound call is not answered, assigning a missed call type status to the first call.

5. The method as defined in claim 1, the method further comprising: at least partly in response to determining that the second outbound call is answered by the call processing system and a voice message is recorded, assigning a voice mail call type status to the first call.

6. The method as defined in claim 1, the method further comprising: at least partly in response to determining that the second outbound call is answered by the call processing system and a fax message is recorded, assigning a fax mail call type status to the first call.

7. The method as defined in claim 1, the method further comprising: providing a first user interface in which a user can view and edit the primary user call log.

8. The method as defined in claim 1, wherein a determination is made that the first outbound call and the third outbound call are not timely answered if at least one of first outbound call and the third outbound call are not answered within a first number of rings.

9. The method as defined in claim 1, the method further comprising transmitting status information related to the third call to a user computer system for display to the user.

10. The method as defined in claim 1, the method further comprising transmitting status information related to the third call to a user computer system for display to the user, wherein status information related to the third call is displayed in substantially real time on the computer system via (a) a client application, (b) a Web page, (c) a widget, (d) a gadget or any combination of (a), (b), (c), and (d).

11. A method of call processing, the method comprising:

accessing a first account at a call processing system wherein the first account has an associated:

first phone address and a second phone address associated with a primary account, and third phone address and a fourth phone address associated with a first secondary user account;

receiving over a network at the call processing system a first call directed to the third phone address, and at least partly in response:

generating a first outbound call to the fourth phone address, and at least partly in response to determining that the first outbound call is not timely answered:

generating a second outbound call to the second phone address, causing at least in part a first telephonic device associated with the first phone address to ring with a first ring type in association with the second outbound call, and logging the status of the first call in a first secondary user call log wherein the first call is not logged to a primary account call log;

receiving over the network at the call processing system a second call directed to the first phone address, and at least partly in response:

generating a third outbound call to the second phone address;

causing at least in part a second telephonic device associated with the first phone address to ring with a second ring type in association with the third outbound call;

logging the status of the second call in the primary user call log.

12. The method as defined in claim 11, wherein the fourth phone address is associated with a first user and a first wireless line.

13. The method as defined in claim 11, the method further comprising: at least partly in response to determining that the second outbound call is not answered, assigning a missed call type status to the first call.

14. The method as defined in claim 11, the method further comprising: at least partly in response to determining that the second outbound call is answered by the call processing system and a voice message is recorded, assigning a voice mail call type status to the first call.

15. The method as defined in claim 11, the method further comprising: at least partly in response to determining that the second outbound call is answered by the call processing system and a fax message is recorded, assigning a fax mail call type status to the first call.

16. The method as defined in claim 11, the method further comprising: providing a first user interface in which a user can view and edit the primary user call log.

17. The method as defined in claim 11, wherein a determination is made that the first outbound call is not timely answered if the first outbound call and is not answered within a first number of rings.

18. The method as defined in claim 11, the method further comprising transmitting status information related to the second call to a user computer system for display to the user.

19. The method as defined in claim 11, the method further comprising transmitting status information related to the second call to a user computer system for display to the user, wherein status information related to the second call is displayed in substantially real time on the computer system via (a) a client application, (b) a Web page, (c) a widget, (d) a gadget or any combination of (a), (b), (c), and (d).

20. A system comprising:
at least one computing device;
program instructions stored in non-transitory memory, that when executed by the at least one computing device, are configured to cause the system to perform operations comprising:
  accessing a first account wherein the first account has an associated: first phone address and a second phone address associated with a primary account, a third phone address associated with a first secondary user account wherein the first secondary user account includes at least a fourth phone address, and a fifth phone address associated with a second secondary user account wherein the first secondary user account includes at least a sixth phone address;
  receiving over a network a first call directed to the third phone address, and at least partly in response:
    generating a first outbound call to the fourth phone address, and at least partly in response to determining that the first outbound call is not timely answered:
      generating a second outbound call to the second phone address, and
      logging the status of the first call in a first secondary user call log wherein the first call is not logged to a primary account call log;
  receiving over the network a second call directed to the fifth phone address, and at least partly in response:
    generating a third outbound call to the sixth phone address and at least partly in response to determining that the third outbound call is not timely answered:
      generating a fourth outbound call to the sixth phone address, and
      logging the status of the second call in a second secondary user call log wherein the second call is not logged to the primary account call log;
  receiving over the network a third call directed to the first phone address, and at least partly in response:
    generating a fifth outbound call to the second phone address; and
    logging the status of the third call in the primary user call log.

* * * * *